United States Patent
Liu et al.

(10) Patent No.: US 11,265,471 B2
(45) Date of Patent: Mar. 1, 2022

(54) GIMBAL CONTROL METHOD, DEVICE, GIMBAL, SYSTEM, AND STORAGE MEDIUM

(71) Applicant: SZ DJI TECHNOLOGY CO., LTD., Shenzhen (CN)

(72) Inventors: Shuai Liu, Shenzhen (CN); Xianmao Chang, Shenzhen (CN); Yingzhi Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/133,905

(22) Filed: Dec. 24, 2020

(65) Prior Publication Data

US 2021/0120179 A1    Apr. 22, 2021

Related U.S. Application Data

(63) Continuation of application No. PCT/CN2019/083935, filed on Apr. 23, 2019.

(51) Int. Cl.
*H04N 5/232* (2006.01)
*H04N 5/225* (2006.01)

(52) U.S. Cl.
CPC ....... *H04N 5/23258* (2013.01); *H04N 5/2252* (2013.01); *H04N 5/225251* (2018.08); *H04N 5/23299* (2018.08)

(58) Field of Classification Search
None
See application file for complete search history.

(56) References Cited

U.S. PATENT DOCUMENTS

| | | | |
|---|---|---|---|
| 9,628,690 B2 * | 4/2017 | Fisher | H04N 5/23203 |
| 2019/0064637 A1 * | 2/2019 | Wang | F16M 11/041 |
| 2019/0079373 A1 * | 3/2019 | Wang | H04N 5/2328 |

(Continued)

FOREIGN PATENT DOCUMENTS

| | | | | |
|---|---|---|---|---|
| CN | 105090695 A | * | 11/2015 | G03B 17/56 |
| CN | 206018229 U | | 3/2017 | |

(Continued)

OTHER PUBLICATIONS

International Search Report of PCT/CN2019/083935 (dated Dec. 20, 2019).

*Primary Examiner* — William B Perkey
(74) *Attorney, Agent, or Firm* — Fideli Law PLLC

(57) ABSTRACT

The present disclosure provides a gimbal control method, a device, a gimbal, a system, and a storage medium. The gimbal includes at least one axis of rotation. The method includes: determining a current first working mode of the gimbal; and if the gimbal satisfies a preset mode switching condition, controlling the gimbal to switch from the first working mode to a second working mode, and enabling the gimbal to maintain smooth and stable operation during the switching process, where in the first working mode, the axis of rotation is configured to enable the gimbal to face a first direction, and in the second working mode, the axis of rotation is configured to enable the gimbal to face a second direction. In this way, smooth transition of the gimbal can be maintained during mode switching, so that stability of image shooting during mode switching of the gimbal is improved.

20 Claims, 5 Drawing Sheets

(56) References Cited

U.S. PATENT DOCUMENTS

2019/0208101 A1* 7/2019 Gohl .................. H04N 5/23261
2021/0018138 A1* 1/2021 Wang ................. F16M 11/2014

FOREIGN PATENT DOCUMENTS

| CN | 206449389 U | 8/2017 |
| CN | 107883123 A | 4/2018 |
| CN | 108496139 A | 9/2018 |
| CN | 109076101 A | 12/2018 |
| DE | 202005001542 U1 | 5/2005 |
| EP | 3139239 A1 | 3/2017 |

* cited by examiner

GIMBAL CONTROL METHOD, DEVICE, GIMBAL, SYSTEM, AND STORAGE MEDIUM

RELATED APPLICATIONS

This application is a continuation application of PCT application No. PCT/CN2019/083935, filed on Apr. 23, 2019, and the content of which is incorporated herein by reference in its entirety.

TECHNICAL FIELD

This disclosure relates to the field of control technologies, and in particular, to a gimbal control method, a device, a gimbal, a system, and a storage medium.

BACKGROUND

Currently, with the development of computer technologies and needs of users, gimbals are applied more extensively, and in particular, applied more extensively in the photographing field. With a handheld gimbal as an example, a user may perform photographing in various forms and scenarios by using a handheld gimbal. Photographing may be performed by using a conventional handheld gimbal in a plurality of modes, for example, a normal shooting mode, shooting with the gimbal being held vertically, a vertical shooting mode, shooting with the gimbal being held horizontally, a reverse-shooting mode, shooting with the gimbal being upside down, a flashlight shooting mode, and shooting with the gimbal facing forward. Different posture control methods are available for the gimbal in different shooting modes, thus satisfying more user needs.

However, in a process of using the gimbal, as an application scenario changes, the gimbal may switch between various shooting modes due to the change of the scenario in the use process, and a change of a gimbal posture may cause a shot image to jitter. Consequently, the video or image shooting may not be smooth, and use experience of the user may be compromised. Therefore, how to improve the smoothness and stability of video or image shooting is of great significance.

SUMMARY

Embodiments of the present disclosure provide a gimbal control method, a device, a gimbal, a system, and a storage medium, which can maintain smooth transition of the gimbal during mode switching, so that stability of image shooting during mode switching of the gimbal is improved.

In a first aspect, the present disclosure provides a method for gimbal control, including: determining a first working mode of a gimbal including at least one axis of rotation; and after the gimbal satisfies a preset mode switching condition, controlling the gimbal to switch from the first working mode to a second working mode, wherein, in the first working mode, the axis of rotation is configured to enable the gimbal to face a first direction, and in the second working mode, the axis of rotation is configured to enable the gimbal to face a second direction.

In a second aspect, the present disclosure provides a gimbal control device, including: at least one storage medium storing a set of instructions; and at least one processor in communication with the at least one storage medium, wherein during operation, the at least one processor executes the set of instructions to: determine a first working mode of a gimbal including at least one axis of rotation; after the gimbal satisfies a preset mode switching condition, control the gimbal to switch from the first working mode to a second working mode, wherein, in the first working mode, the axis of rotation is configured to enable the gimbal to face a first direction, and in the second working mode, the axis of rotation is configured to enable the gimbal to face a second direction.

In the embodiments of the present disclosure, the gimbal control device controls the gimbal to switch from the current first working mode to the second working mode when the gimbal satisfies a preset mode switching condition, so that the stability of the gimbal is maintained when the first working mode is switched to the second working mode. Therefore, it is ensured that a shot image captured by the photographing apparatus in the switching process of the gimbal from the first working mode to the second working mode does not jitter, and the sharpness of the shot image is improved.

BRIEF DESCRIPTION OF THE DRAWINGS

To describe the technical solutions in some exemplary embodiments of the present disclosure or the existing technology more clearly, the following briefly describes the accompanying drawings for describing the exemplary embodiments. Apparently, the accompanying drawings in the following description show merely some exemplary embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the scope of protection of the present disclosure.

The following describes in detail some implementations of the present disclosure with reference to the accompanying drawings. Under a condition that no conflict occurs, the following embodiments and features in the embodiments may be combined with each other.

A gimbal control method provided in some exemplary embodiments of the present disclosure may be performed by a gimbal control system. The gimbal control system includes a gimbal control device and a gimbal. In some embodiments, the gimbal control device may be mounted on the gimbal. In some embodiments, the gimbal control device may be spatially independent of the gimbal. In some embodiments, the gimbal control device may be a component of the gimbal, that is, the gimbal includes the gimbal control device. In some embodiments, the gimbal includes at least one axis of rotation, where the axis of rotation is configured to cause the gimbal to face a direction. In some embodiments, the gimbal may carry a photographing apparatus. In other embodiments, the gimbal control method may be applied to a handheld gimbal, or may be applied to another mobile device, for example, a mobile device that can autonomously move, such as a robot, an unmanned aerial vehicle, an unmanned vehicle, an unmanned watercraft, or the like.

Figure 1:
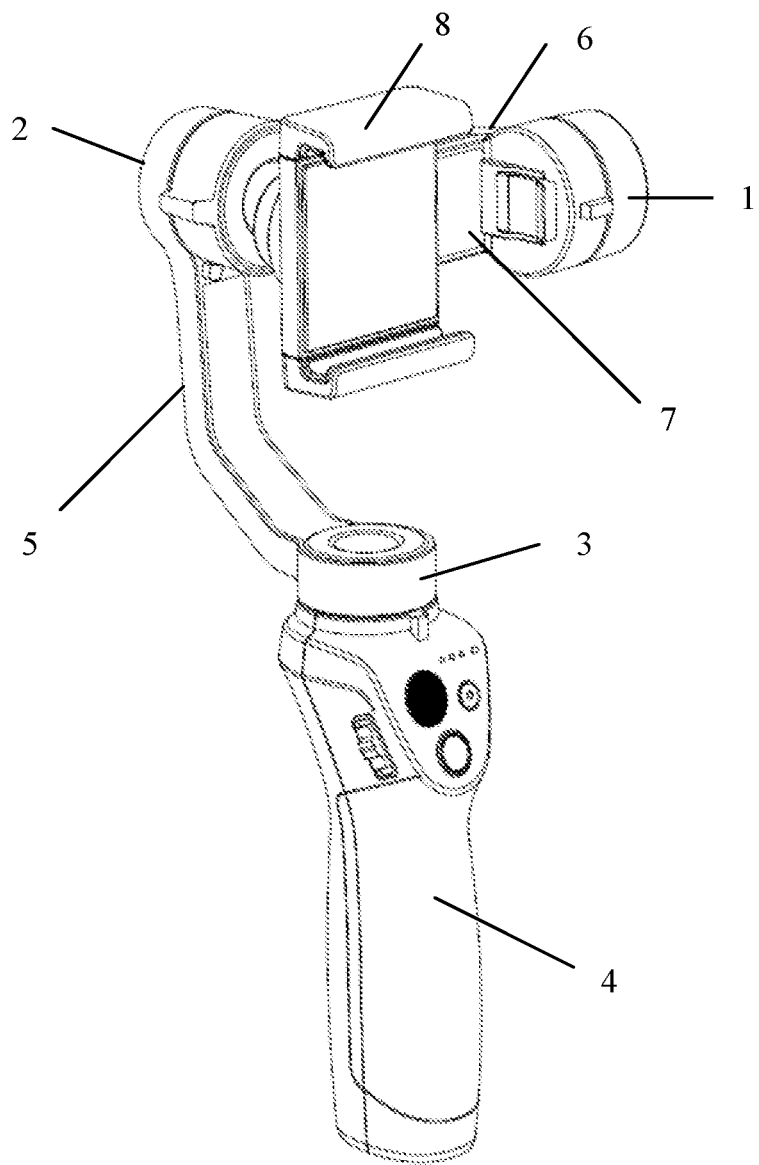
FIG. 1 is a schematic diagram of a gimbal according to some exemplary embodiments of the present disclosure.

Specifically, FIG. 1 may be used as an example for describing the gimbal. FIG. 1 is a schematic diagram of a gimbal according to embodiments of the present disclosure. As shown in FIG. 1, the gimbal includes a third connection member 7, a second connection member 6, a first connection member 5, and a gimbal base 4. Specifically, the first connection member 5 is mounted on the gimbal base 4, the second connection member 6 is mounted on the first connection member 5, and the third connection member 7 is mounted on the second connection member 6. The gimbal base 4 is rotatably connected to the first connection member 5 by using a first motor 3, and may rotate around a yaw axis direction; the first connection member 5 is rotatably connected to the second connection member 6 by using a second motor 2, and may rotate around a roll axis direction; and the second connection member 6 is rotatably connected to the third connection member 7 by using a third motor 1, and may rotate around a pitch axis direction. In some implementations, axes of rotation of the first motor 3, the second motor 2 and the third motor 1 are spatially perpendicular to each other, and intersect at one point.

It should be understood that FIG. 1 is merely a schematic diagram of a gimbal provided as an example. A tri-axis connection mode in embodiments of the present disclosure is not limited to the manner of yaw-roll-pitch, and may also be in another connection sequence; the axes of rotation of the three motors are not necessarily spatially perpendicular to each other disclosure in some embodiments of the present disclosure, and implementations of oblique intersection of two of the three axes may also exist. Certainly, embodiments of the present disclosure are not limited to such a tri-axis gimbal, and the gimbal may also be a gimbal including another quantity of axes of rotation.

As shown in FIG. 1, in some implementations, the third connection member 7 has a photographing apparatus fixing mechanism 8. A photographing apparatus (not shown in FIG. 1) may be mounted in the photographing apparatus fixing mechanism 8. In this embodiment of the present disclosure, the photographing apparatus fixing mechanism 8 is not necessary. When the gimbal is configured to carry an external photographing apparatus such as a mobile phone or a camera, the photographing apparatus fixing mechanism may be included. When the gimbal itself is integrated with a photographing apparatus such as an integrated camera, the photographing apparatus fixing mechanism may not be included.

Running of the third motor 1 drives the third connection member 7 to rotate, so that the photographing apparatus fixing mechanism 8 rotates around the pitch direction to drive the photographing apparatus to rotate around the pitch direction. The third connection member 7 may also be referred to as a pitch axis arm (pitch axis arm). Running of the second motor 2 drives the second connection member 6 to rotate, to drive the photographing apparatus to rotate around the roll direction. The second connection member 6 may also be referred to as a roll axis arm (roll axis arm). Running of the first motor 3 drives the first connection member 5 to rotate, to drive the photographing apparatus to deviate in a horizontal direction. The first connection member 5 may also be referred to as a yaw axis arm (yaw axis arm).

The gimbal control method provided in embodiments of the present disclosure may control a posture of the gimbal in the horizontal direction by controlling the first connection member 5 and/or the gimbal base 4 of the gimbal, in order to control stability of the gimbal in a shooting process, so that when a shooting scenario changes, the posture of the gimbal does not change sharply, which may otherwise cause the gimbal to jitter. Therefore, images obtained by shooting can transit smoothly.

In embodiments of the present disclosure, when the gimbal satisfies a preset mode switching condition in the first working mode, the gimbal may be controlled to switch from the first working mode to a second working mode, so that the gimbal maintains smooth and stable operation during the switching process, where in the first working mode, the axis of rotation is configured to cause the gimbal to face a first direction, and in the second working mode, the axis of rotation is configured to cause the gimbal to face a second direction. In some embodiments, the working mode of the gimbal includes, but is not limited to, any one of a upright shooting mode, a vertical shooting mode, a flashlight style mode, a suspension mode, and the like. Herein, the first direction refers to that the gimbal in the first working mode stabilizes the photographing apparatus so that the photographing apparatus faces the first direction for shooting, and the photographing apparatus and the gimbal base are by default in a fixed position relationship related to the first working mode. For example, referring to FIG. 1, in a default upright shooting mode, the gimbal in normal use may provide stylization in a front direction and a picture shot by the photographing apparatus carried on the gimbal is in horizontal. The meaning of the second direction is similar to that of the first direction, and is thus not described again herein. In embodiments of the present disclosure, the first direction and the second direction may be the same or may be different.

It should be additionally noted that the first direction and the second direction may change due to an operation or the like. For example, in the first working mode, a user may control the axis of rotation of the gimbal by controlling a rudder stick or a dial. In this case, an orientation of the gimbal correspondingly changes, but the orientation of the gimbal is fixedly the first direction when the user does not operate the axis of rotation.

It should also be noted that the axis of rotation in the first working mode and the axis of rotation in the second working mode may be a same axis of rotation, or may be different axes of rotation. For example, assuming that the first working mode is the upright shooting mode shooting mode, and that the second working mode is the flashlight style mode, the axes of rotation in both the upright shooting mode and the flashlight style mode are the pitch axis. In this case, a pitch angle of the photographing apparatus carried on the gimbal can be controlled. Assuming that the first working mode is the upright shooting mode, and that the second working mode is the vertical shooting mode, the axis of rotation in the upright shooting mode is the pitch axis, and the pitch angle of the photographing apparatus carried on the gimbal can be controlled; the axis of rotation in the vertical shooting mode is the roll axis, and a roll angle of the photographing apparatus carried on the gimbal can be controlled.

In some embodiments, the first working mode may include the upright shooting mode, and the second working mode may include the flashlight style mode; or the first working mode may include the flashlight style mode, and the second working mode may include the upright shooting mode.

Figure 6:
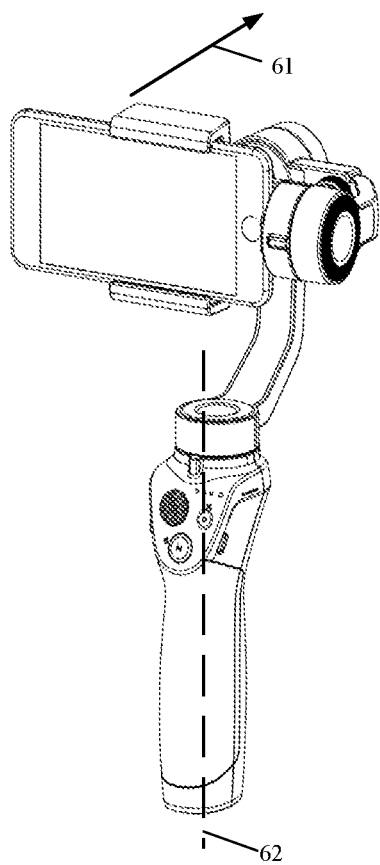
FIG. 6 is a schematic diagram of an upright shooting mode according to some exemplary embodiments of the present disclosure.

In some embodiments, the axis of rotation in the upright shooting mode is configured to cause the gimbal to face a direction having an angle of approximately 90 degrees with the gimbal base. Using FIG. 6 as an example, FIG. 6 is a schematic diagram of a upright shooting mode according to an embodiment of the present disclosure. As shown in FIG. 6, the photographing apparatus is a mobile phone, and an orientation 61 of the gimbal has an angle of approximately 90 degrees with a gimbal base 62 and is parallel to the ground.

Figure 7:
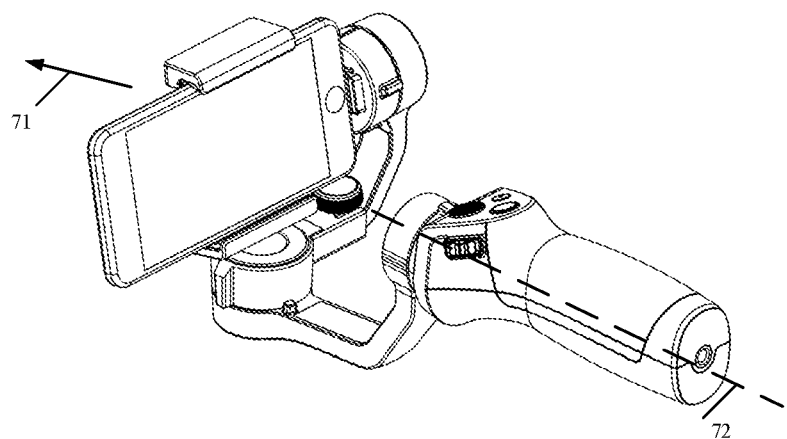
FIG. 7 is a schematic diagram of a flashlight style mode according to some exemplary embodiments of the present disclosure.

In some embodiments, the axis of rotation in the flashlight style mode is configured to cause the gimbal to face a direction approximately parallel to the gimbal base. Using FIG. 7 as an example, FIG. 7 is a schematic diagram of a flashlight style mode according to exemplary embodiments of the present disclosure. As shown in FIG. 7, the photographing apparatus is a mobile phone, and an orientation 71 of the gimbal is approximately parallel to a gimbal base 72. When an operation of the user causes the pitch axis of the gimbal to change, an angle may exist between the orientation 71 of the gimbal and the gimbal base 72.

In some exemplary embodiments, both the first working mode and the second working mode include a state mode, where the state mode includes a non-follow mode and a follow mode. In some embodiments, the state mode of the gimbal during power-on is the non-follow mode, and the gimbal needs to transition from the non-follow mode to the follow mode.

In some embodiments, the follow mode in the upright shooting mode refers to that the gimbal moves with the base of the gimbal and that the posture of the gimbal changes with rotation of the gimbal base in a process of shooting by the photographing apparatus carried on the gimbal. In some embodiments, the follow mode of the flashlight style mode refers to that the gimbal moves following the first connection member of the gimbal and that the posture of the gimbal changes with rotation of the first connection member in a shooting process. In some embodiments, the non-follow mode of the upright shooting mode refers to that the gimbal does not follow the base of the gimbal to move and that the posture of the gimbal does not change with rotation of the gimbal base in a shooting process. In some embodiments, the non-follow mode of the flashlight style mode refers to that the gimbal does not follow the first connection member of the gimbal to move and that the posture of the gimbal does not change with rotation of the first connection member in a shooting process.

In some exemplary embodiments, in a shooting process, when the gimbal moves from upper left to lower right, the gimbal undergoes the upright shooting mode and the flashlight style mode. In some embodiments, the gimbal in the follow mode of the upright shooting mode may move following a yaw angle of the gimbal base. In some embodiments, the gimbal in the follow mode of the flashlight style mode may move following a yaw angle of the first connection member of the gimbal.

In some exemplary embodiments, when the current first working mode of the gimbal is the upright shooting mode, if it is detected that an angle between a z-axis in a world coordinate system of the gimbal and an x-axis of the first connection member of the gimbal is greater than a first preset threshold, or the foregoing angle is less than a second preset threshold, it may be determined that the gimbal enters the flashlight style mode. In some embodiments, the first preset threshold is greater than the second preset threshold. In some embodiments, the angle may be determined and obtained by an angle sensor on the gimbal.

For example, assuming that the first preset threshold is 140 degrees, and that the second preset threshold is 40 degrees, and that the gimbal is currently in the upright shooting mode, if it is detected that the angle between the z-axis in the world coordinate system of the gimbal and the x-axis of the first connection member of the gimbal is greater than 140 degrees or that this angle is less than 40 degrees, it may be determined that the gimbal enters the flashlight style mode.

In some exemplary embodiments, when the current first working mode of the gimbal is the flashlight style mode, if it is detected that an angle between the z-axis in the world coordinate system of the gimbal and the x-axis of the first connection member of the gimbal is greater than a third preset threshold and less than a fourth preset threshold, it may be determined that the gimbal exits the current flashlight style mode and enters the upright shooting mode. In some embodiments, the third preset threshold is less than the fourth preset threshold.

For example, assuming that the third preset threshold is 50 degrees, and that the fourth preset threshold is 130 degrees, and that the gimbal is currently in the flashlight style mode, if it is detected that the angle between the z-axis in the world coordinate system of the gimbal and the x-axis of the first connection member of the gimbal is greater than 50 degrees and less than 130 degrees, it may be determined that the gimbal exits the flashlight style mode and enters the upright shooting mode.

In some exemplary embodiments, when the current first working mode of the gimbal is the upright shooting mode, if the gimbal is in the non-follow mode, measurement attitudes of the gimbal in the upright shooting mode may be obtained, where the measurement attitudes include a yaw angle of the gimbal base and a yaw angle of the gimbal. A first non-follow yaw angle of the gimbal in the non-follow mode of the upright shooting mode may be determined based on a difference between the yaw angle of the gimbal and the yaw angle of the gimbal base. A first non-follow yaw angle deviation of the gimbal in the non-follow mode of the upright shooting mode may be determined based on a difference between the first non-follow yaw angle and a non-follow expected angle indicated by the non-follow mode. In some embodiments, the first non-follow yaw angle of the gimbal in the upright shooting mode is limited in a preset angle range. In some embodiments, the preset angle range includes a range of angles that are greater than or equal to −180 degrees and less than or equal to 180 degrees.

For example, assuming that the gimbal in the current upright shooting mode is in the non-follow mode, if obtained measurement attitudes of the gimbal in the upright shooting mode include a 0 degree yaw angle of the gimbal base and a 50 degrees yaw angle of the gimbal, the first non-follow yaw angle being 50 degrees may be determined by calculating a difference between the 50 degrees yaw angle of the gimbal and the 0 degree yaw angle of the gimbal base. If the non-follow expected angle indicated by the non-follow mode is 20 degrees, the first non-follow yaw angle deviation of the gimbal in the non-follow mode of the upright shooting mode may be determined as 50−20=30 degrees based on the difference between the 50 degrees first non-follow yaw angle and the 20 degrees non-follow expected angle as indicated by the non-follow mode.

As can be seen, in embodiments of the present disclosure, the first non-follow yaw angle deviation of the gimbal in the non-follow mode of the upright shooting mode may be determined by using the yaw angle of the gimbal base, the yaw angle of the gimbal, and the non-follow expected angle as indicated by the non-follow mode, so that the motion of the gimbal in the non-follow mode of the upright shooting mode may be controlled by using the first non-follow yaw angle deviation, which helps calculate a first follow yaw angle deviation during subsequent switching to the follow mode.

In some exemplary embodiments, when the current first working mode of the gimbal is the upright shooting mode, if the gimbal is in the follow mode, it may be determined that the gimbal in the upright shooting mode switches from the non-follow mode to the follow mode. A first follow yaw angle of the gimbal in the follow mode of the upright shooting mode may be determined based on a sum of the first non-follow yaw angle deviation and the non-follow expected angle. A first follow yaw angle deviation of the gimbal in the follow mode of the upright shooting mode may be determined based on a difference between the yaw angle of the gimbal base and a target expected angle, and a sum of the difference and the first follow yaw angle. In some embodiments, the target expected angle includes a sum of a follow expected angle indicated by the follow mode and the non-follow expected angle indicated by the non-follow mode.

For example, assuming that the yaw angle of the base of the gimbal is adjusted from 0 degree to 20 degrees, if the target expected angle indicated by the follow mode is 50 degrees, and the first non-follow yaw angle deviation is 30 degrees, and the non-follow expected angle is 20 degrees, the first follow yaw angle of the gimbal in the follow mode of the upright shooting mode may be determined as 50 degrees based on that fact that the sum of the 30 degrees first non-follow yaw angle deviation and the 20 degrees non-follow expected angle is 50 degrees. In addition, the first follow yaw angle deviation of the gimbal in the follow mode of the upright shooting mode is determined as 20 degrees based on a difference of −30 degrees between the 20 degrees yaw angle of the gimbal base and the 50 degrees target expected angle indicated by the follow mode, and a sum of the difference of −30 degrees and the first follow yaw angle of 50 degrees: −30+50=20 degrees.

As can be seen, in embodiments of the present disclosure, the first follow yaw angle deviation of the gimbal in the follow mode of the upright shooting mode may be determined by using the first non-follow yaw angle deviation, the yaw angle of the gimbal base, the non-follow expected angle, and the follow expected angle that are determined and obtained by the gimbal in the non-follow mode, so that the motion of the gimbal in the follow mode of the upright shooting mode can be controlled based on the first follow yaw angle deviation, so as to ensure that the gimbal keeps stable when the gimbal switches from the non-follow mode of the upright shooting mode to the follow mode.

In some exemplary embodiments, when the current first working mode of the gimbal is the flashlight style mode, if the gimbal is in the non-follow mode, measurement attitudes of the gimbal in the flashlight style mode may be obtained, where the measurement attitudes include a yaw angle of the first connection member of the gimbal and a yaw angle of the gimbal. A second non-follow yaw angle of the gimbal in the non-follow mode of the flashlight style mode may be determined based on a difference between the yaw angle of the gimbal and the yaw angle of the first connection member of the gimbal. A second non-follow yaw angle deviation of the gimbal in the non-follow mode of the flashlight style mode may be determined based on a difference between the second non-follow yaw angle and a non-follow expected angle indicated by the non-follow mode.

For example, assuming that the gimbal in the current flashlight style mode is in the non-follow mode, if obtained measurement attitudes of the gimbal in the upright shooting mode include 0 degree of the yaw angle of the first connection member and 40 degrees of the yaw angle of the gimbal, 40 degrees of the second non-follow yaw angle may be determined by calculating a difference between the 40 degrees yaw angle of the gimbal and the 0 degree yaw angle of the first connection member. If the non-follow expected angle indicated by the non-follow mode is 20 degrees, the second non-follow yaw angle deviation of the gimbal in the non-follow mode of the flashlight style mode may be determined as 40−20=20 degrees based on the difference between the 40 degrees second non-follow yaw angle and the 20 degrees non-follow expected angle as indicated by the non-follow mode.

As can be seen, in this embodiment of the present disclosure, the second non-follow yaw angle deviation of the gimbal in the non-follow mode of the flashlight style mode may be determined by using the yaw angle of the first connection member of the gimbal, the yaw angle of the gimbal, and the non-follow expected angle indicated by the non-follow mode, so that the motion of the gimbal in the non-follow mode of the flashlight style mode can be controlled by using the second non-follow yaw angle deviation, which helps calculate a second follow yaw angle deviation during subsequent switching to the follow mode.

In some exemplary embodiments, when the current first working mode of the gimbal is the flashlight style mode, if the gimbal is in the follow mode, it may be determined that the gimbal in the flashlight style mode switches from the non-follow mode to the follow mode. The second follow yaw angle is determined based on a sum of the second non-follow yaw angle and the non-follow expected angle indicated by the non-follow mode. In addition, a third follow yaw angle deviation of the gimbal in the follow mode of the flashlight style mode is determined based on a difference between the yaw angle of the first connection member of the gimbal and a target expected angle indicated by the follow mode, and a sum of the difference and the second follow yaw angle.

For example, assuming that the current yaw angle of the first connection member of the gimbal is adjusted from 0 degree to 20 degrees, if the target expected angle indicated by the follow mode is 50 degrees, the second non-follow yaw angle deviation is 20 degrees, and the non-follow expected angle is 20 degrees, the second follow yaw angle of the gimbal in the follow mode of the flashlight style mode may be determined as 40 degrees based on the fact that a sum of 20 degrees of the second non-follow yaw angle deviation and the 20 degrees of non-follow expected angle being 40 degrees. In addition, the third follow yaw angle deviation of the gimbal in the follow mode of the upright shooting mode may be determined as 10 degrees based on a difference of −30 degrees between the 200 degrees yaw angle of the first connection member of the gimbal and the 50 degrees target expected angle as indicated by the follow mode, and a sum of the difference of −30 degrees and the 40 degrees of the second follow yaw angle: −30+40=10 degrees.

As can be seen, in this embodiment of the present disclosure, the second follow yaw angle deviation of the gimbal in the follow mode of the flashlight style mode may be determined by using the second non-follow yaw angle deviation, the yaw angle of the first connection member, the non-follow expected angle, and the follow expected angle that are determined and obtained by the gimbal in the non-follow mode of the flashlight style mode, so that the motion of the gimbal in the follow mode of the flashlight style mode may be controlled based on the second follow yaw angle deviation, so as to ensure that the gimbal keeps stable when the gimbal switches from the non-follow mode of the flashlight style mode to the follow mode.

In some exemplary embodiments, if the gimbal satisfies a preset mode switching condition, the gimbal may be controlled to switch from the first working mode to the second working mode, so that the gimbal maintains smooth and stable operation during the switching process. To ensure that there is no abrupt speed change during switching between the first working mode and the second working mode, in the switching process, the gimbal may switch from the follow mode of the first working mode to the follow mode of the second working mode, and ensure the stability of the gimbal during the process of switching from the follow mode of the first working mode to the follow mode of the second working mode.

In some embodiments, the second follow yaw angle deviation of the gimbal switching to the follow mode of the flashlight style mode is determined based on a difference between the first follow yaw angle deviation and the third follow yaw angle deviation. In the switching process, the continuity between the second follow yaw angle deviation as the gimbal switching from the follow mode of the first working mode to the follow mode of the second working mode and the first follow yaw angle deviation as the gimbal in the follow mode of the first working mode before switching needs to be maintained, so as to ensure that there is no abrupt speed change during the switching process and ensure that the gimbal maintains smooth and stable operation during the switching process.

In some exemplary embodiments, when the current first working mode of the gimbal is the upright shooting mode, if the gimbal in the follow mode of the upright shooting mode satisfies a preset mode switching condition, the gimbal may be controlled to switch from the follow mode of the upright shooting mode to the flashlight style mode. In some embodiments, satisfying the preset mode switching condition includes, but is not limited to, switching of shooting scenarios, for example, on land, shooting pictures from a building far away to a vehicle on the ground next to the building, or in water, shooting a video from a person above to corals below.

To ensure that the gimbal maintains smooth and stable operation during the switching process, when the gimbal switches from the follow mode of the upright shooting mode to the follow mode of the flashlight style mode, the second follow yaw angle deviation of the gimbal switching to the follow mode of the flashlight style mode may be determined based on the difference between the first follow yaw angle deviation of the gimbal in the follow mode of the upright shooting mode and the third follow yaw angle deviation of the gimbal in the follow mode of the flashlight style mode, so that the motion of the gimbal may be controlled based on the second follow yaw angle deviation. Therefore, it is ensured that the movement of the gimbal can maintain smooth and stable operation during the switching process.

For example, it is assumed that the current first working mode of the gimbal is the upright shooting mode, and that the first non-follow yaw angle deviation of the gimbal that is obtained as 30 degrees through calculation in the non-follow mode of the upright shooting mode, and that the first follow yaw angle deviation of the gimbal that is obtained as 20 degrees through calculation in the follow mode of the upright shooting mode. If it is detected that the gimbal submerges from a water surface for underwater shooting when the gimbal moves in the follow mode of the upright shooting mode, it may be determined that the gimbal satisfies a preset mode switching condition. If it is obtained through calculation that the third follow yaw angle deviation is 10 degrees based on the foregoing example, then it may be determined that the second follow yaw angle deviation is 10 degrees when the gimbal switching to the follow mode of the flashlight style mode based on the difference between the first follow yaw angle deviation of 20 degrees and the third follow yaw angle deviation of 10 degrees, so that the motion of the gimbal may be controlled based on the second follow yaw angle deviation of 10 degrees. Therefore, it is ensured that the movement of the gimbal can maintain smooth and stable operation during the switching process.

As can be seen, in the embodiments of the present disclosure, by determining the second follow yaw angle deviation of the gimbal switching from the upright shooting mode to the flashlight style mode, it can be ensured that the gimbal keeps stable in the switching process. Therefore, it is ensured that a shot image captured by the photographing apparatus during the switching process of the gimbal does not jitter, and sharpness of the shot image in the mode switching process is improved.

In some exemplary embodiments, if the gimbal performs periodic switching processing based on a preset period, a periodic follow yaw angle deviation may be determined based on a preset weight and the second follow yaw angle deviation. In addition, a periodic follow yaw angle deviation after switching of the gimbal may be determined based on a difference between the yaw angle of the first connection member of the gimbal and the target expected angle, and a sum of the difference and the second follow yaw angle, as well as the periodic follow yaw angle deviation, so that the motion of the gimbal after switching may be controlled based on the periodic follow yaw angle deviation.

For example, assuming that the preset weight is 0.999 and that the second follow yaw angle deviation is 10 degrees, if the gimbal performs periodic switching processing based on a preset period, the periodic follow yaw angle deviation may be determined as: 0.999*10=9.99 degrees. If the yaw angle of the first connection member of the gimbal is 20 degrees, the target expected angle is 50 degrees, and the second follow yaw angle deviation is 40 degrees, the periodic follow yaw angle deviation of the gimbal may be determined as: 20−50+40+9.99=19.99 degrees.

As can be seen, such periodic control on the gimbal can maintain the continuity of the gimbal on a basis of maintaining the stability of the gimbal during the switching process, so as to ensure the stability of the gimbal, ensure that a shot image does not jitter, and improve the sharpness of the shot images.

With reference to accompanying drawings, the following exemplarily describes gimbal control systems provided in the embodiments of the present disclosure.

Figure 2A:
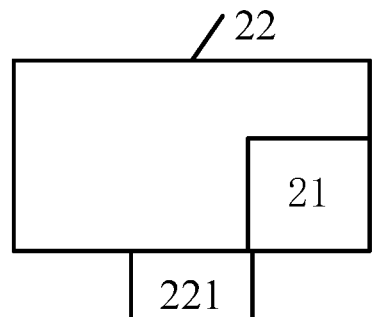
FIG. 2a is a schematic structural diagram of a gimbal control system according to some exemplary embodiments of the present disclosure.
Figure 2B:
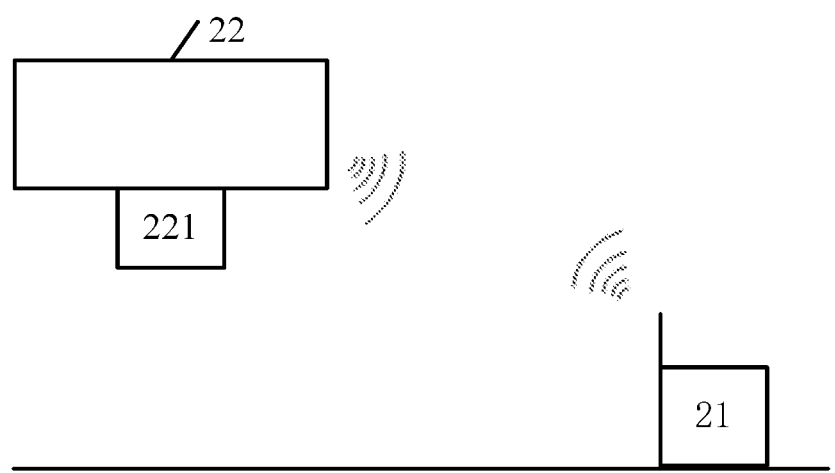
FIG. 2b is a schematic structural diagram of another gimbal control system according to some exemplary embodiments of the present disclosure.

Referring to FIG. 2a and FIG. 2b, FIG. 2a is a schematic structural diagram of a gimbal control system according to exemplary embodiments of the present disclosure, and FIG. 2b is a schematic structural diagram of another gimbal control system according to exemplary embodiments of the present disclosure. The gimbal control system includes: a gimbal control device 21 and a gimbal 22. A communication connection may be established between the gimbal 22 and the gimbal control device 21 in a wireless communication connection mode. In some scenarios, a communication connection may also be established between the gimbal 22 and the gimbal control device 21 in a wired communication connection mode. The gimbal 22 may be a handheld gimbal, and may also be applied to a mobile device such as an unmanned vehicle, an unmanned watercraft, or a mobile robot. The gimbal 22 may carry a photographing apparatus 221. In some embodiments, as shown in FIG. 2a, the gimbal control device 21 may be disposed on the gimbal 22. In other embodiments, as shown in FIG. 2b, the gimbal 22 and the gimbal control device 21 are independent of each other. For example, the gimbal control device 21 is a separately used accessory or is provided in a cloud server, and a communication connection to the gimbal 22 may be established in the wireless communication connection mode.

In embodiments of the present disclosure, if the gimbal in a current first working mode satisfies a preset mode switching condition, the gimbal control device 21 may control the gimbal to switch from the first working mode to a second working mode, in order to ensure that the gimbal maintains smooth and stable operation during the switching process. Therefore, it is ensured that a shot image captured by the photographing apparatus in the switching process of the gimbal does not jitter, and the sharpness of the shot image in the switching process is improved.

With reference to accompanying drawings, the following exemplarily describes gimbal control methods provided in the embodiments of the present disclosure.

Figure 3:
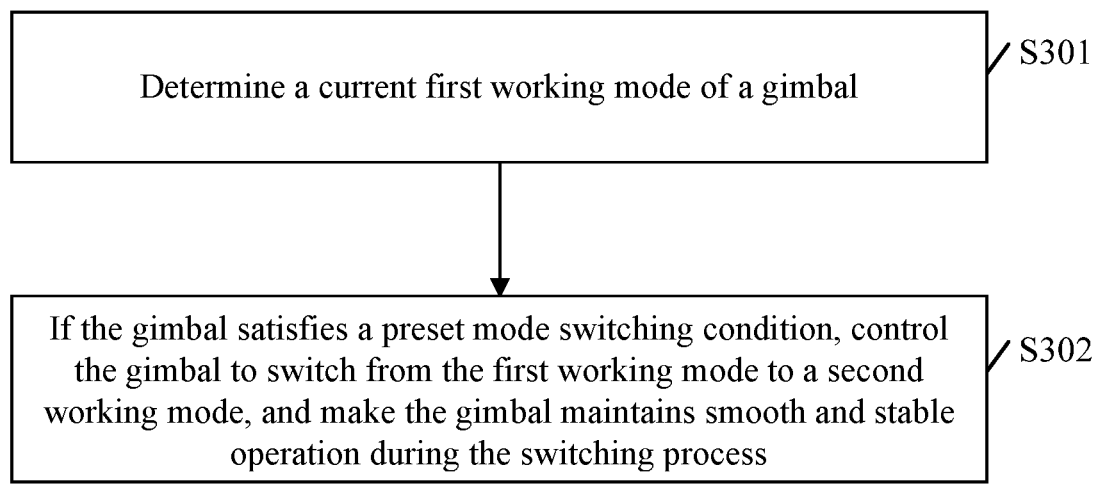
FIG. 3 is a schematic flowchart of a gimbal control method according to some exemplary embodiments of the present disclosure.

Specifically, referring to FIG. 3, FIG. 3 is a schematic flowchart of a gimbal control method according to exemplary embodiments of the present disclosure. The method may be performed by a gimbal control device. Detailed descriptions for the gimbal control device are the same as above. Specifically, the method in embodiments of the present disclosure may include the following steps.

S301. Determine a current first working mode of a gimbal.

In embodiments of the present disclosure, the gimbal control device may determine the current first working mode of the gimbal. In some embodiments, the first working mode may include an upright shooting mode or a flashlight style mode.

S302. If the gimbal satisfies a preset mode switching condition, control the gimbal to switch from the first working mode to a second working mode, and make the gimbal maintains smooth and stable operation during the switching process.

In t embodiments of the present disclosure, if the gimbal satisfies the preset mode switching condition, the gimbal control device may control the gimbal to switch from the first working mode to the second working mode, so that the gimbal moves smoothly and stably during the switching process, where in the first working mode, the axis of rotation is configured to cause the gimbal to face a first direction, and in the second working mode, the axis of rotation is configured to cause the gimbal to face a second direction. Explanations about the first direction and the second direction are the same as above, and will not be described again herein. In some embodiments, the first working mode includes an upright shooting mode, and the second working mode includes a flashlight style mode; or the first working mode includes a flashlight style mode, and the second working mode includes an upright shooting mode.

In some embodiments, that the gimbal satisfies a preset mode switching condition includes: an angle between the gimbal and a first connection member of the gimbal satisfies a preset condition. In some embodiments, the angle between the gimbal and the first connection member of the gimbal refers to an angle between a z-axis in a world coordinate system of the gimbal and an x-axis of the first connection member of the gimbal.

In some embodiments, that an angle between the gimbal and a first connection member of the gimbal satisfies a preset condition includes: the angle is greater than a first preset threshold, or the angle is less than a second preset threshold, where the first preset threshold is greater than the second preset threshold. In some embodiments, that an angle between the gimbal and a first connection member of the gimbal satisfies a preset condition includes: the angle is greater than a third preset threshold and less than a fourth preset threshold, where the third preset threshold is less than the fourth preset threshold. Specific embodiments and examples are the same as above, and will not be described again herein.

In some embodiments, the angle between the gimbal and the first connection member of the gimbal may change following a change of a shooting mode, an application scenario, or the like. In some embodiments, the shooting mode may include a mode such as horizontal rotation shooting, up to down shooting, or upper-left to lower-right shooting. In some embodiments, the application scenario may include an application scenario such as, on land, shooting pictures from a building far away to a vehicle on the ground next to the building, or in water, shooting a video from a person above to corals below. The application scenario is not specifically limited in embodiments of the present disclosure.

In some exemplary embodiments, if the gimbal satisfies the preset mode switching condition, the gimbal control device may obtain measurement attitudes of the gimbal in the first working mode, determine a posture deviation of the gimbal based on the measurement attitudes, and control, based on the posture deviation, the gimbal to switch from the first working mode to the second working mode.

In some exemplary embodiments, when obtaining the measurement attitudes of the gimbal in the first working mode, the gimbal control device may determine a state mode of the gimbal in the first working mode, and obtain the measurement attitudes of the gimbal in the first working mode based on the state mode. In some embodiments, the state mode includes a non-follow mode and a follow mode.

In some exemplary embodiments, the first working mode includes an upright shooting mode, the state mode includes a non-follow mode, and the measurement attitudes include a yaw angle of the gimbal base and a yaw angle of the gimbal; and when determining the posture deviation of the gimbal based on the measurement attitudes, the gimbal control device may determine a first non-follow yaw angle of the gimbal in the non-follow mode of the upright shooting mode based on a difference between the yaw angle of the gimbal and the yaw angle of the gimbal base; and determine a first non-follow yaw angle deviation of the gimbal in the non-follow mode of the upright shooting mode based on a difference between the first non-follow yaw angle and a non-follow expected angle indicated by the non-follow mode. Specific embodiments and examples are the same as above, and will not be described again herein.

In some exemplary embodiments, the first working mode includes an upright shooting mode, and the state mode includes a follow mode; when determining the posture deviation of the gimbal based on the measurement attitudes, if detecting that the gimbal is in the follow mode of the upright shooting mode, the gimbal control device may determine that the gimbal switches from the non-follow mode to the follow mode in the upright shooting mode; determine a first follow yaw angle of the gimbal in the follow mode of the upright shooting mode based on a sum of the first non-follow yaw angle deviation and the non-follow expected angle; and determine a first follow yaw angle deviation of the gimbal in the follow mode of the upright shooting mode based on a follow expected angle indicated by the follower state pattern, the yaw angle of the gimbal base, and the first follower yawing angle.

In some exemplary embodiments, when determining the first follow yaw angle deviation of the gimbal in the follow mode of the upright shooting mode based on the follow expected angle indicated by the follower state pattern, the yaw angle of the gimbal base, and the first follow yaw angle, the gimbal control device may determine a target expected angle based on a sum of the follow expected angle indicated by the follow mode and the non-follow expected angle; determine a first angle based on a sum of the yaw angle of the gimbal base and the first follow yaw angle; and determine the first follow yaw angle deviation of the gimbal in the follow mode of the upright shooting mode based on a difference between the first angle and the target expected angle.

For example, assuming that the follow expected angle indicated by the follow mode is 30 degrees and that the non-follow expected angle is 20 degrees, the gimbal control device may determine the target expected angle to be 50 degrees based on a sum of the 30 degrees follow expected angle indicated by the follow mode and the 20 degrees non-follow expected angle. If the current yaw angle of the base of the gimbal is 20 degrees, and the first follow yaw angle obtained through calculation is 50 degrees, then the gimbal control device may determine, based on a sum of the 20 degrees yaw angle of the gimbal base and the 50 degrees first follow yaw angle, that the first angle is 70 degrees. The gimbal control device may determine, based on a difference between the 70 degrees first angle and the 50 degrees target expected angle, that the first follow yaw angle deviation of the gimbal in the follow mode of the upright shooting mode is 20 degrees.

As can be seen, through the first follow yaw angle deviation of the gimbal in the non-follow mode, the motion of the gimbal in the follow mode of the upright shooting mode may be controlled, so as to ensure that the gimbal keeps stable when the gimbal switches from the non-follow mode of the upright shooting mode to the follow mode.

In some exemplary embodiments, when controlling, based on the posture deviation, the gimbal to switch from the first working mode to the second working mode, the gimbal control device may obtain a yaw angle of the first connection member of the gimbal and the yaw angle of the gimbal; determine, based on the yaw angle of the first connection member of the gimbal and the yaw angle of the gimbal, a second non-follow yaw angle deviation of the gimbal switching to a non-follow mode of a flashlight style mode; determine, based on the yaw angle of the first connection member of the gimbal and the yaw angle of the gimbal, a second follow yaw angle deviation of the gimbal switching to a follow mode of the flashlight style mode; and control, based on the second follow yaw angle deviation, the gimbal to switch from the upright shooting mode to the flashlight style mode.

In some exemplary embodiments, when determining, based on the yaw angle of the first connection member of the gimbal and the yaw angle of the gimbal, the second non-follow yaw angle deviation of the gimbal switching to the non-follow mode of the flashlight style mode, the gimbal control device may determine, based on a difference between the yaw angle of the gimbal and the yaw angle of the first connection member, a second non-follow yaw angle of the gimbal switching to the non-follow mode of the flashlight style mode; and determine the second non-follow yaw angle deviation of the gimbal in the non-follow mode of the flashlight style mode based on a difference between the second non-follow yaw angle and the non-follow expected angle. Specific embodiments and examples are the same as above, and will not be described again herein.

In some exemplary embodiments, when determining, based on the yaw angle of the first connection member of the gimbal and the yaw angle of the gimbal, the second follow yaw angle deviation of the gimbal switching to the follow mode of the flashlight style mode, the gimbal control device may determine a second follow yaw angle of the gimbal in the follow mode of the flashlight style mode based on a sum of the second non-follow yaw angle and the first non-follow control angle; and determine the second follow yaw angle deviation of the gimbal in the follow mode of the flashlight style mode based on the yaw angle of the first connection member of the gimbal, the second follow yaw angle, and a target expected angle.

In some exemplary embodiments, when determining the second follow yaw angle deviation of the gimbal in the follow mode of the flashlight style mode based on the yaw angle of the first connection member of the gimbal, the second follow yaw angle, and the target expected angle, the gimbal control device may determine a second angle based on a sum of the yaw angle of the first connection member of the gimbal and the second follow yaw angle; determine a difference between the second angle and the target expected angle as a third follow yaw angle deviation; and determine the second follow yaw angle deviation of the gimbal based on a difference between a first follow yaw angle deviation of the gimbal in a follow mode of the upright shooting mode and the third follow yaw angle deviation.

For example, assuming that the current yaw angle of the first connection member of the gimbal is 20 degrees and that the second follow yaw angle is 40 degrees, the gimbal control device may determine, based on a sum of the 20 degrees yaw angle of the first connection member and the 40 degrees second follow yaw angle, that the second angle is 60 degrees. If the follow expected angle indicated by the follow mode is 30 degrees, and the non-follow expected angle is 20 degrees, then the gimbal control device may determine the target expected angle to be 50 degrees based on a sum of the 30 degrees follow expected angle as indicated by the follow mode and the 20 degrees non-follow expected angle. The gimbal control device may determine that a difference between the 60 degrees second angle and the 50 degrees target expected angle is 10 degrees, that is, the third follow yaw angle deviation is 10 degrees. If the first follow yaw angle deviation is 20 degrees, the gimbal control device may determine, based on a difference between the 20 degrees first follow yaw angle deviation in the follow mode of the upright shooting mode and the 10 degrees of the third follow yaw angle deviation, that the second follow yaw angle deviation of the gimbal is 10 degrees.

As can be seen, in embodiments of the present disclosure, by means of determining the second follow yaw angle deviation of the gimbal switching from the upright shooting mode to the flashlight style mode, it can be ensured that the gimbal keeps stable during the switching process. Therefore, it is ensured that a shot image captured by a photographing apparatus during the switching process of the gimbal does not jitter, and the sharpness of the shot image in the mode switching process is improved.

In embodiments of the present disclosure, the gimbal control device determines the current first working mode of the gimbal, and when the gimbal satisfies the preset mode switching condition, controls the gimbal to switch from the first working mode to the second working mode, so as to ensure that the gimbal maintains smooth and stable operation during the switching process. This implementation can ensure that the gimbal keeps stable when the gimbal switches from the first working mode to the second working mode. Therefore, it is ensured that a shot image captured by the photographing apparatus in the switching process of the gimbal from the first working mode to the second working mode does not jitter, and the sharpness of the shot image is improved.

Figure 4:
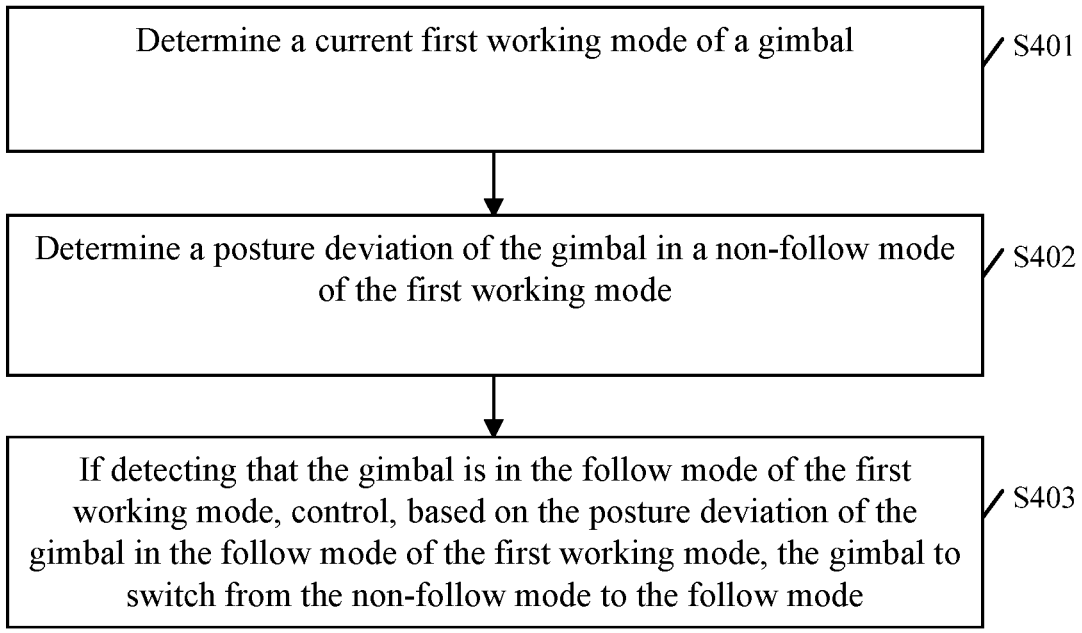
FIG. 4 is a schematic flowchart of another gimbal control method according to some exemplary embodiments of the present disclosure.

Specifically, referring to FIG. 4, FIG. 4 is a schematic flowchart of another gimbal control method according to exemplary embodiments of the present disclosure. The method may be performed by a gimbal control device. Detailed explanations about the gimbal control device are the same as above. A difference between this embodiment of the present disclosure and the embodiment shown in FIG. 3 lies in that this embodiment of the present disclosure is an exemplary description about a process of switching between different state modes in a same working mode. Specifically, the method in this embodiment of the present disclosure includes the following steps.

S401. Determine a current first working mode of a gimbal.

In embodiments of the present disclosure, the gimbal control device may determine the current first working mode of the gimbal. Explanations about the first working mode are the same as above, and will not be described again herein.

S402. Determine a posture deviation of the gimbal in a non-follow mode of the first working mode.

In embodiments of the present disclosure, the gimbal control device may determine the posture deviation of the gimbal in the non-follow mode of the first working mode.

In some exemplary embodiments, the first working mode includes an upright shooting mode, and the posture deviation includes a first non-follow yaw angle deviation. The gimbal control device may determine the first non-follow yaw angle deviation of the gimbal in the non-follow mode of the upright shooting mode based on measurement attitudes of the gimbal in the upright shooting mode.

In some embodiments, the measurement attitudes include a yaw angle of the gimbal base and a yaw angle of the gimbal; and the gimbal control device may determine a first non-follow yaw angle of the gimbal in the non-follow mode of the upright shooting mode based on a difference between the yaw angle of the gimbal and the yaw angle of the gimbal base; and determine the first non-follow yaw angle deviation of the gimbal in the non-follow mode of the upright shooting mode based on a difference between the first non-follow yaw angle and a non-follow expected angle indicated by the non-follow mode.

For example, assuming that the yaw angle of the gimbal is 50 degrees and that the yaw angle of the gimbal base is 0 degree, the gimbal control device may determine, based on a difference between the yaw angle of the gimbal being 50 degrees and the yaw angle of the gimbal base being 0 degree, that the first non-follow yaw angle of the gimbal in the non-follow mode of the upright shooting mode is 50 degrees. If the non-follow expected angle indicated by the non-follow mode is 20 degrees, the gimbal control device may determine, based on a difference between the 50 degrees first non-follow yaw angle and the 20 degrees non-follow expected angle indicated by the non-follow mode, that the first non-follow yaw angle deviation of the gimbal in the non-follow mode of the upright shooting mode is 30 degrees.

As can be seen, in this embodiment of the present disclosure, determining the first non-follow yaw angle deviation of the gimbal in the non-follow mode of the upright shooting mode helps determine a posture deviation of the gimbal switching from the non-follow mode to a follow mode in the upright shooting mode, so as to ensure the stability of the gimbal.

S403. If detecting that the gimbal is in the follow mode of the first working mode, control, based on the posture deviation of the gimbal in the follow mode of the first working mode, the gimbal to switch from the non-follow mode to the follow mode.

In embodiments of the present disclosure, if detecting that the gimbal is in the follow mode of the first working mode, the gimbal control device may determine the posture deviation of the gimbal in the follow mode of the first working mode, and control, based on the posture deviation of the gimbal in the follow mode of the first working mode, the gimbal to switch from the non-follow mode to the follow mode.

In some exemplary embodiments, if determining that the gimbal in the upright shooting mode switches from the non-follow mode to the follow mode, the gimbal control device may determine a first follow yaw angle of the gimbal in the follow mode of the upright shooting mode based on a sum of the first non-follow yaw angle deviation and the non-follow expected angle. The gimbal control device may determine a target expected angle based on a sum of a follow expected angle indicated by the follow mode and the non-follow expected angle; determine a first angle based on a sum of the yaw angle of the gimbal base and the first follow yaw angle; and determine a first follow yaw angle deviation of the gimbal in the follow mode of the upright shooting mode based on a difference between the first angle and the target expected angle, so as to control the motion of the gimbal in the follow mode of the upright shooting mode based on the first follow yaw angle deviation.

For example, assuming that the first non-follow yaw angle deviation is 30 degrees and that the non-follow expected angle is 20 degrees, the gimbal control device may determine, based on a sum of the 30 degrees first non-follow yaw angle deviation and the 20 degrees non-follow expected angle of, that the first follow yaw angle of the gimbal in the follow mode of the upright shooting mode is 50 degrees. If the follow expected angle indicated by the follow mode is 30 degrees, and the non-follow expected angle is 20 degrees, the gimbal control device may determine, based on a sum of the 30 degrees follow expected angle indicated by the follow mode and the 20 degrees non-follow expected angle, that the target expected angle is 50 degrees. If the yaw angle of the gimbal base is 20 degrees, the gimbal control device may determine, based on a sum of the 20 degrees yaw angle of the gimbal base and the 50 degrees first follow yaw angle, that the first angle is 70 degrees. The gimbal control device may determine, based on a difference between the 70 degrees first angle and the 50 degrees target expected angle, that the first follow yaw angle deviation of the gimbal in the follow mode of the upright shooting mode is 20 degrees.

In embodiments of the present disclosure, the gimbal control device may determine the posture deviation of the gimbal in the non-follow mode of the first working mode, and when detecting that the gimbal switches from the non-follow mode of the first working mode to the follow mode of the first working mode, control, based on the posture deviation of the gimbal in the follow mode of the first working mode, the gimbal to switch from the non-follow mode to the follow mode. This implementation can ensure that the gimbal keeps stable during the gimbal switches from the non-follow mode to the follow mode. Therefore, it is ensured that a shot image captured by a photographing apparatus in the process of switching by the gimbal from the non-follow mode to the follow mode does not jitter, and the sharpness of the shot image is improved.

Figure 5:
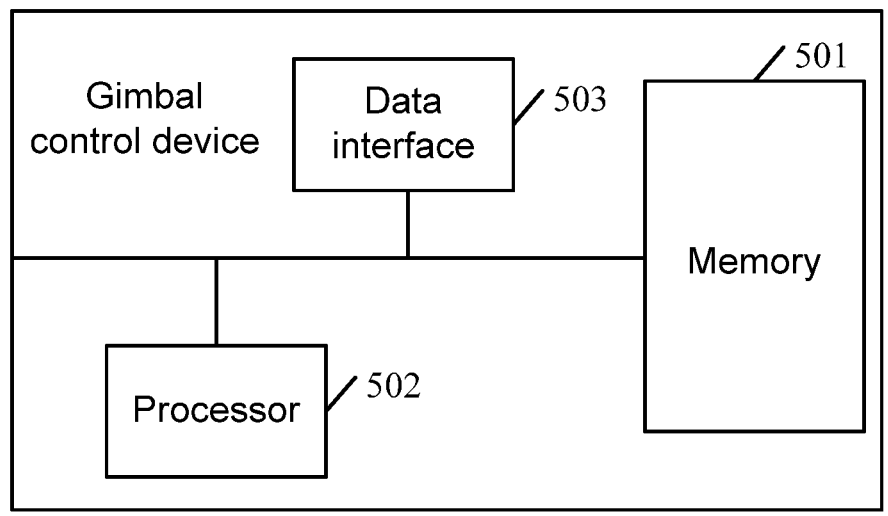
FIG. 5 is a schematic structural diagram of a gimbal control device according to some exemplary embodiments of the present disclosure.

Referring to FIG. 5, FIG. 5 is a schematic structural diagram of a gimbal control device according to exemplary embodiments of the present disclosure. Specifically, the gimbal control device includes at least a memory 501 (i.e., at least one storage medium) and at least a processor 502 in communication therewith.

In some exemplary embodiments, the gimbal control device may further include a data interface 503, where the data interface 503 is configured to transfer data information between the gimbal control device and another device.

The memory 501 may include a volatile memory. The memory 501 may also include a non-volatile memory. The memory 501 may further include a combination of the foregoing types of memories. The processor 502 may be a central processing unit (CPU). The processor 502 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), or any combination thereof.

The at least one memory 501 (i.e., at least one storage medium) is configured to store a program instruction or a set of instructions. The at least one processor 502 may invoke the program instruction (a set of instructions) stored in the memory 501, and is configured to perform the following steps:

determine a current first working mode of the gimbal; and if the gimbal satisfies a preset mode switching condition, control the gimbal to switch from the first working mode to a second working mode, and enabling the gimbal to maintain smooth and stable operation during the switching process, where in the first working mode, the axis of rotation is configured to cause the gimbal to face a first direction, and in the second working mode, the axis of rotation is configured to cause the gimbal to face a second direction.

Further, the first working mode includes a upright shooting mode, and the second working mode includes a flashlight style mode; or the first working mode includes a flashlight style mode, and the second working mode includes a upright shooting mode.

Further, when controlling the gimbal to switch from the first working mode to the second working mode if the gimbal satisfies the preset mode switching condition, the processor 502 is specifically configured to:

if the gimbal satisfies the preset mode switching condition, obtain measurement attitudes of the gimbal in the first working mode, and determine a posture deviation of the gimbal based on the measurement attitudes; and control, based on the posture deviation, the gimbal to switch from the first working mode to the second working mode.

Further, when obtaining the measurement attitudes of the gimbal in the first working mode, the processor 502 is specifically configured to:

determine a state mode of the gimbal in the first working mode; and obtain the measurement attitudes of the gimbal in the first working mode based on the state mode.

Further, the first working mode includes an upright shooting mode, the state mode includes a non-follow mode, and the measurement attitudes include a yaw angle of the gimbal base and a yaw angle of the gimbal; and when determining the posture deviation of the gimbal based on the measurement attitudes, the processor 502 is specifically configured to:

determine a first non-follow yaw angle of the gimbal in the non-follow mode of the upright shooting mode based on a difference between the yaw angle of the gimbal and the yaw angle of the gimbal base; and determine a first non-follow yaw angle deviation of the gimbal in the non-follow mode of the upright shooting mode based on a difference between the first non-follow yaw angle and a non-follow expected angle indicated by the non-follow mode.

Further, the state mode includes a follow mode; and when determining the posture deviation of the gimbal based on the measurement attitudes, the processor 502 is specifically configured to:

if detecting that the gimbal is in the follow mode of the upright shooting mode, determine that the gimbal switches from the non-follow mode to the follow mode in the upright shooting mode;

determine a first follow yaw angle of the gimbal in the follow mode of the upright shooting mode based on a sum of the first non-follow yaw angle deviation and the non-follow expected angle; and determine a first follow yaw angle deviation of the gimbal in the follow mode of the upright shooting mode based on a follow expected angle indicated by the follow mode, the yaw angle of the gimbal base, and the first follow yaw angle.

Further, when determining the first follow yaw angle deviation of the gimbal in the follow mode of the upright shooting mode based on the follow expected angle indicated by the follow mode, the yaw angle of the gimbal base, and the first follow yaw angle, the processor 502 is specifically configured to:

determine a target expected angle based on a sum of the follow expected angle indicated by the follow mode and the non-follow expected angle;

determine a first angle based on a sum of the yaw angle of the gimbal base and the first follow yaw angle; and determine the first follow yaw angle deviation of the gimbal in the follow mode of the upright shooting mode based on a difference between the first angle and the target expected angle.

Further, when controlling, based on the posture deviation, the gimbal to switch from the first working mode to the second working mode, the processor 502 is specifically configured to:

obtain a yaw angle of the first connection member of the gimbal and the yaw angle of the gimbal;

determine, based on the yaw angle of the first connection member of the gimbal and the yaw angle of the gimbal, a second non-follow yaw angle deviation of the gimbal switching to a non-follow mode of a flashlight style mode;

determine, based on the yaw angle of the first connection member of the gimbal and the yaw angle of the gimbal, a second follow yaw angle deviation of the gimbal switching to a follow mode of the flashlight style mode; and control, based on the second follow yaw angle deviation, the gimbal to switch from the upright shooting mode to the flashlight style mode.

Further, when determining, based on the yaw angle of the first connection member of the gimbal and the yaw angle of the gimbal, the second non-follow yaw angle deviation of the gimbal switching to the non-follow mode of the flashlight style mode, the processor 502 is specifically configured to:

determine, based on a difference between the yaw angle of the gimbal and the yaw angle of the first connection member, a second non-follow yaw angle of the gimbal switching to the non-follow mode of the flashlight style mode; and determine the second non-follow yaw angle deviation of the gimbal in the non-follow mode of the flashlight style mode based on a difference between the second non-follow yaw angle and the non-follow expected angle.

Further, when determining, based on the yaw angle of the first connection member of the gimbal and the yaw angle of the gimbal, the second follow yaw angle deviation of the gimbal switching to the follow mode of the flashlight style mode, the processor 502 is specifically configured to:

determine a second follow yaw angle of the gimbal in the follow mode of the flashlight style mode based on a sum of the second non-follow yaw angle and the first non-follow control angle; and determine the second follow yaw angle deviation of the gimbal in the follow mode of the flashlight style mode based on the yaw angle of the first connection member of the gimbal, the second follow yaw angle, and a target expected angle.

Further, when determining the second follow yaw angle deviation of the gimbal in the follow mode of the flashlight style mode based on the yaw angle of the first connection member of the gimbal, the second follow yaw angle, and the target expected angle, the processor 502 is specifically configured to:

determine a second angle based on a sum of the yaw angle of the first connection member of the gimbal and the second follow yaw angle;

determine a difference between the second angle and the target expected angle as a third follow yaw angle deviation; and determine the second follow yaw angle deviation of the gimbal based on a difference between a first follow yaw angle deviation of the gimbal in a follow mode of the upright shooting mode and the third follow yaw angle deviation.

Further, that the gimbal satisfies a preset mode switching condition includes: an angle between the gimbal and a first connection member of the gimbal satisfies a preset condition.

Further, that an angle between the gimbal and a first connection member of the gimbal satisfies a preset condition includes: the angle is greater than a first preset threshold, or the angle is less than a second preset threshold, where the first preset threshold is greater than the second preset threshold.

Further, that an angle between the gimbal and a first connection member of the gimbal satisfies a preset condition includes: the angle is greater than a third preset threshold and less than a fourth preset threshold, where the third preset threshold is less than the fourth preset threshold.

Further, the first non-follow yaw angle satisfies a preset angle range.

Further, the preset angle range is greater than or equal to −180 degrees and less than or equal to 180 degrees.

In embodiments of the present disclosure, the gimbal control device determines the current first working mode of the gimbal, and when the gimbal satisfies the preset mode switching condition, controls the gimbal to switch from the first working mode to the second working mode, to ensure that the gimbal maintain smooth and stable operation during the switching process. This implementation can ensure that the gimbal keeps stable when the gimbal switches from the first working mode to the second working mode. Therefore, it is ensured that a shot image captured by a photographing apparatus in the switching process of the gimbal from the first working mode to the second working mode does not jitter, and the sharpness of the shot image is improved.

Embodiments of the present disclosure further provide a gimbal. The gimbal in this embodiment of the present disclosure may include one or more processors and one or more angle sensors. The processor and the angle sensor are connected via a bus. The processor is configured to perform the following steps:

determine a current first working mode of the gimbal; and if the gimbal satisfies a preset mode switching condition, control the gimbal to switch from the first working mode to a second working mode, and enable the gimbal to maintain smooth and stable operation during the switching process, where in the first working mode, the axis of rotation is configured to cause the gimbal to face a first direction, and in the second working mode, the axis of rotation is configured to cause the gimbal to face a second direction.

Further, the first working mode includes a upright shooting mode, and the second working mode includes a flashlight style mode; or the first working mode includes a flashlight style mode, and the second working mode includes a upright shooting mode.

Further, when controlling the gimbal to switch from the first working mode to the second working mode if the gimbal satisfies the preset mode switching condition, the processor is specifically configured to:

if the gimbal satisfies the preset mode switching condition, obtain measurement attitudes of the gimbal in the first working mode, and determine a posture deviation of the gimbal based on the measurement attitudes; and control, based on the posture deviation, the gimbal to switch from the first working mode to the second working mode.

Further, when obtaining the measurement attitudes of the gimbal in the first working mode, the processor is specifically configured to:

determine a state mode of the gimbal in the first working mode; and obtain the measurement attitudes of the gimbal in the first working mode based on the state mode.

Further, the first working mode includes an upright shooting mode, the state mode includes a non-follow mode, and the measurement attitudes include a yaw angle of the gimbal base and a yaw angle of the gimbal; and when determining the posture deviation of the gimbal based on the measurement attitudes, the processor is specifically configured to:

determine a first non-follow yaw angle of the gimbal in the non-follow mode of the upright shooting mode based on a difference between the yaw angle of the gimbal and the yaw angle of the gimbal base; and determine a first non-follow yaw angle deviation of the gimbal in the non-follow mode of the upright shooting mode based on a difference between the first non-follow yaw angle and a non-follow expected angle indicated by the non-follow mode.

Further, the state mode includes a follow mode; and when determining the posture deviation of the gimbal based on the measurement attitudes, the processor is specifically configured to:

if detecting that the gimbal is in the follow mode of the upright shooting mode, determine that the gimbal switches from the non-follow mode to the follow mode in the upright shooting mode;

determine a first follow yaw angle of the gimbal in the follow mode of the upright shooting mode based on a sum of the first non-follow yaw angle deviation and the non-follow expected angle; and determine a first follow yaw angle deviation of the gimbal in the follow mode of the upright shooting mode based on a follow expected angle indicated by the follow mode, the yaw angle of the gimbal base, and the first follow yaw angle.

Further, when determining the first follow yaw angle deviation of the gimbal in the follow mode of the upright shooting mode based on the follow expected angle indicated by the follow mode, the yaw angle of the gimbal base, and the first follow yaw angle, the processor is specifically configured to:

determine a target expected angle based on a sum of the follow expected angle indicated by the follow mode and the non-follow expected angle;

determine a first angle based on a sum of the yaw angle of the gimbal base and the first follow yaw angle; and determine the first follow yaw angle deviation of the gimbal in the follow mode of the upright shooting mode based on a difference between the first angle and the target expected angle.

Further, when controlling, based on the posture deviation, the gimbal to switch from the first working mode to the second working mode, the processor is specifically configured to:

obtain a yaw angle of the first connection member of the gimbal and the yaw angle of the gimbal;

determine, based on the yaw angle of the first connection member of the gimbal and the yaw angle of the gimbal, a second non-follow yaw angle deviation of the gimbal switching to a non-follow mode of a flashlight style mode;

determine, based on the yaw angle of the first connection member of the gimbal and the yaw angle of the gimbal, a second follow yaw angle deviation of the gimbal switching to a follow mode of the flashlight style mode; and control, based on the second follow yaw angle deviation, the gimbal to switch from the upright shooting mode to the flashlight style mode.

Further, when determining, based on the yaw angle of the first connection member of the gimbal and the yaw angle of the gimbal, the second non-follow yaw angle deviation of the gimbal switching to the non-follow mode of the flashlight style mode, the processor is specifically configured to:

determine, based on a difference between the yaw angle of the gimbal and the yaw angle of the first connection member, a second non-follow yaw angle of the gimbal switching to the non-follow mode of the flashlight style mode; and determine the second non-follow yaw angle deviation of the gimbal in the non-follow mode of the flashlight style mode based on a difference between the second non-follow yaw angle and the non-follow expected angle.

Further, when determining, based on the yaw angle of the first connection member of the gimbal and the yaw angle of the gimbal, the second follow yaw angle deviation of the gimbal switching to the follow mode of the flashlight style mode, the processor is specifically configured to:

determine a second follow yaw angle of the gimbal in the follow mode of the flashlight style mode based on a sum of the second non-follow yaw angle and the first non-follow control angle; and determine the second follow yaw angle deviation of the gimbal in the follow mode of the flashlight style mode based on the yaw angle of the first connection member of the gimbal, the second follow yaw angle, and a target expected angle.

Further, when determining the second follow yaw angle deviation of the gimbal in the follow mode of the flashlight style mode based on the yaw angle of the first connection member of the gimbal, the second follow yaw angle, and the target expected angle, the processor is specifically configured to:

determine a second angle based on a sum of the yaw angle of the first connection member of the gimbal and the second follow yaw angle;

determine a difference between the second angle and the target expected angle as a third follow yaw angle deviation; and determine the second follow yaw angle deviation of the gimbal based on a difference between a first follow yaw angle deviation of the gimbal in a follow mode of the upright shooting mode and the third follow yaw angle deviation.

Further, that the gimbal satisfies a preset mode switching condition includes: an angle between the gimbal and a first connection member of the gimbal satisfies a preset condition.

Further, that an angle between the gimbal and a first connection member of the gimbal satisfies a preset condition includes: the angle is greater than a first preset threshold, or the angle is less than a second preset threshold, where the first preset threshold is greater than the second preset threshold.

Further, that an angle between the gimbal and a first connection member of the gimbal satisfies a preset condition includes: the angle is greater than a third preset threshold and less than a fourth preset threshold, where the third preset threshold is less than the fourth preset threshold.

Further, the first non-follow yaw angle satisfies a preset angle range.

Further, the preset angle range is greater than or equal to −180 degrees and less than or equal to 180 degrees.

In embodiments of the present disclosure, when the gimbal satisfies the preset mode switching condition, the gimbal is controlled to switch from the current first working mode to the second working mode, so that the gimbal maintains smooth and stable operation during the switching process. This implementation can ensure that the gimbal keeps stable when the gimbal switches from the first working mode to the second working mode. Therefore, it is ensured that a shot image captured by a photographing apparatus in the switching process of the gimbal from the first working mode to the second working mode does not jitter, and sharpness of the shot image is improved.

Embodiments of the present disclosure further provide a gimbal control system, including a gimbal control device and a gimbal, where the gimbal includes at least one axis of rotation;

the gimbal control device is configured to determine a current first working mode of the gimbal, and if the gimbal satisfies a preset mode switching condition, send a control instruction to the gimbal; and the gimbal is configured to control, in response to the control instruction, the gimbal to switch from the first working mode to a second working mode, and enable the gimbal to maintain smooth and stable operation during the switching process, where in the first working mode, the axis of rotation is configured to cause the gimbal to face a first direction, and in the second working mode, the axis of rotation is configured to cause the gimbal to face a second direction.

In embodiments of the present disclosure, when the gimbal satisfies the preset mode switching condition, the gimbal control device controls the gimbal to switch from the current first working mode to the second working mode, so that the gimbal maintains smooth and stable operation during the switching process. Therefore, a shot image captured by a photographing apparatus in the process of switching by the gimbal from the first working mode to the second working mode does not jitter, and the sharpness of the shot image is improved.

Embodiments of the present disclosure further provide a computer-readable storage medium, where the computer-readable storage medium stores a computer program, and when the computer program is executed by a processor, the method described in the corresponding embodiments in FIG. 3 or FIG. 4 of the present disclosure is implemented, or the device described in the corresponding embodiments in FIG. 5 of the present disclosure is implemented. Details will not be described again herein.

The computer-readable storage medium may be an internal storage unit of the device in any one of the foregoing embodiments, for example, a hard disk or a memory of the device. Alternatively, the computer-readable storage medium may be an external storage device of the device, for example, a removable hard disk configured on the device, a smart memory card (SMC), a secure digital (SD) card, or a flash memory card (Flash Card). Moreover, the computer-readable storage medium may further include an internal storage unit of the device and an external storage device. The computer-readable storage medium is configured to store the computer program and another program and data required by the device. The computer-readable storage medium may be further configured to temporarily store data that is already output or will be output.

What is disclosed above is merely some embodiments of the present disclosure, and is certainly not intended to limit the scope of protection of the present disclosure. Therefore, equivalent variations made in accordance with the claims of the present disclosure shall fall within the scope of the present disclosure.

What is claimed is:

1. A method for gimbal control, comprising:
   determining a first working mode of a gimbal including at least one axis of rotation; and
   after the gimbal satisfies a preset mode switching condition, controlling the gimbal to switch from the first working mode to a second working mode,
   wherein, in the first working mode, the axis of rotation is configured to enable the gimbal to face a first direction, and in the second working mode, the axis of rotation is configured to enable the gimbal to face a second direction.

2. The method according to claim 1, wherein
   the first working mode includes an upright shooting mode, and the second working mode includes a flashlight style mode; or
   the first working mode includes a flashlight style mode, and the second working mode includes an upright shooting mode.

3. The method according to claim 1, wherein the controlling of the gimbal to switch from the first working mode to the second working mode after the gimbal satisfies a preset mode switching condition includes:
   obtaining measurement attitudes of the gimbal in the first working mode, and determining a posture deviation of the gimbal based on the measurement attitudes; and
   controlling, based on the posture deviation, the gimbal to switch from the first working mode to the second working mode.

4. The method according to claim 3, wherein the obtaining of the measurement attitudes of the gimbal in the first working mode includes:
   determining a state mode of the gimbal in the first working mode; and
   obtaining the measurement attitudes of the gimbal in the first working mode based on the state mode.

5. The method according to claim 4, wherein the gimbal includes a gimbal base;
   the first working mode includes an upright shooting mode, the state mode includes a non-follow mode and a follow mode, the measurement attitudes include a yaw angle of the gimbal base and a yaw angle of the gimbal; and
   the determining of the posture deviation of the gimbal based on the measurement attitudes includes:
   determining a first non-follow yaw angle of the gimbal in the non-follow mode of the upright shooting mode based on a difference between the yaw angle of the gimbal and the yaw angle of the gimbal base; and
   determining a first non-follow yaw angle deviation of the gimbal in the non-follow mode of the upright shooting mode based on a difference between the first non-follow yaw angle and a non-follow expected angle indicated by the non-following state mode.

6. The method according to claim 5, wherein the determining of the posture deviation of the gimbal based on the measurement attitudes includes:
   upon detecting that the gimbal is in the follow mode of the upright shooting mode, determining that the gimbal switches from the non-follow mode to the follow mode in the upright shooting mode;
   determining a first follow yaw angle of the gimbal in the follow mode of the upright shooting mode based on a sum of the first non-follow yaw angle deviation and the non-follow expected angle; and determining a first follow yaw angle deviation of the gimbal in the follow mode of the upright shooting mode based on a follow expected angle indicated by the follow mode, the yaw angle of the gimbal base, and the first follow yaw angle.

7. The method according to claim 6, wherein the determining of the first follow yaw angle deviation of the gimbal in the follow mode of the upright shooting mode based on the follow expected angle indicated by the follow mode, the yaw angle of the gimbal base, and the first follow yaw angle includes:

determining a target expected angle based on a sum of the follow expected angle indicated by the follow mode and the non-follow expected angle;

determining a first angle based on a sum of the yaw angle of the gimbal base and the first follow yaw angle; and determining the first follow yaw angle deviation of the gimbal in the follow mode of the upright shooting mode based on a difference between the first angle and the target expected angle.

8. The method according to claim 5, wherein the gimbal includes a first connection member; and the controlling, based on the posture deviation, of the gimbal to switch from the first working mode to the second working mode includes:

obtaining a yaw angle of the first connection member of the gimbal and the yaw angle of the gimbal;

determining, based on the yaw angle of the first connection member and the yaw angle of the gimbal, a second non-follow yaw angle deviation of the gimbal for the gimbal to switch to a non-follow mode of a flashlight style mode;

determining, based on the yaw angle of the first connection member of the gimbal and the yaw angle of the gimbal, a second follow yaw angle deviation of the gimbal for the gimbal to switch to a following state mode of the flashlight style mode; and controlling, based on the second follow yaw angle deviation, the gimbal to switch from the upright shooting mode to the flashlight style mode.

9. The method according to claim 8, wherein the determining, based on the yaw angle of the first connection member of the gimbal and the yaw angle of the gimbal, of the second non-follow yaw angle deviation of the gimbal for the gimbal to switch to the non-follow mode of the flashlight style mode includes:

determining, based on a difference between the yaw angle of the gimbal and the yaw angle of the first connection member, a second non-follow yaw angle of the gimbal for the gimbal to switch to the non-following state mode of the flashlight style mode; and determining the second non-follow yaw angle deviation of the gimbal in the non-follow mode of the flashlight style mode based on a difference between the second non-follow yaw angle and the non-follow expected angle.

10. The method according to claim 8, wherein the determining, based on the yaw angle of the first connection member of the gimbal and the yaw angle of the gimbal, of the second follow yaw angle deviation of the gimbal for the gimbal to switch to the following state mode of the flashlight style mode includes:

determining a second follow yaw angle of the gimbal in the follow mode of the flashlight style mode based on a sum of a second non-follow yaw angle and a first non-follow control angle; and determining the second follow yaw angle deviation of the gimbal in the follow mode of the flashlight style mode based on the yaw angle of the first connection member, the second follow yaw angle, and a target expected angle.

11. A gimbal control device, comprising:

at least one storage medium storing a set of instructions; and at least one processor in communication with the at least one storage medium, wherein during operation, the at least one processor executes the set of instructions to:

determine a first working mode of a gimbal including at least one axis of rotation;

after the gimbal satisfies a preset mode switching condition, control the gimbal to switch from the first working mode to a second working mode, wherein, in the first working mode, the axis of rotation is configured to enable the gimbal to face a first direction, and in the second working mode, the axis of rotation is configured to enable the gimbal to face a second direction.

12. The device according to claim 11, wherein the first working mode includes an upright shooting mode, and the second working mode comprises a flashlight style mode; or the first working mode includes a flashlight style mode, and the second working mode comprises an upright shooting mode.

13. The device according to claim 11, wherein to control the gimbal to switch from the first working mode to the second working mode after the gimbal satisfies the preset mode switching condition, the at least one processor executes the set of instructions to:

obtain measurement attitudes of the gimbal in the first working mode, and determine a posture deviation of the gimbal based on the measurement attitudes; and control, based on the posture deviation, the gimbal to switch from the first working mode to the second working mode.

14. The device according to claim 13, wherein to obtain the measurement attitudes of the gimbal in the first working mode, the at least one processor executes the set of instructions to:

determine a state mode of the gimbal in the first working mode; and obtain the measurement attitudes of the gimbal in the first working mode based on the state mode.

15. The device according to claim 14, wherein the gimbal includes a gimbal base;

the first working mode includes an upright shooting mode, the state mode includes a non-follow mode and a follow mode, the measurement attitudes include a yaw angle of the gimbal base and a yaw angle of the gimbal; and to determine the posture deviation of the gimbal based on the measurement attitudes, the at least one processor executes the set of instructions to:

determine a first non-follow yaw angle of the gimbal in the non-follow mode of the upright shooting mode based on a difference between the yaw angle of the gimbal and the yaw angle of the gimbal base; and determine a first non-follow yaw angle deviation of the gimbal in the non-follow mode of the upright shooting mode based on a difference between the first non-follow yaw angle and a non-follow expected angle indicated by the non-follow mode.

16. The device according to claim 15, wherein
the state mode includes a follow mode; and
to determine the posture deviation of the gimbal based on the measurement attitudes, the at least one processor executes the set of instructions to:
  upon detecting that the gimbal is in the follow mode of the upright shooting mode, determine that the gimbal switches from the non-follow mode to the follow mode in the upright shooting mode;
  determine a first follow yaw angle of the gimbal in the follow mode of the upright shooting mode based on a sum of the first non-follow yaw angle deviation and the non-follow expected angle; and
  determine a first follow yaw angle deviation of the gimbal in the follow mode of the upright shooting mode based on a follow expected angle indicated by the follow mode, the yaw angle of the gimbal base, and the first follow yaw angle.

17. The device according to claim 16, wherein to determine the first follow yaw angle deviation of the gimbal in the follow mode of the upright shooting mode based on the follow expected angle indicated by the follow mode, the yaw angle of the gimbal base, and the first follow yaw angle, the at least one processor executes the set of instructions to:
  determine a target expected angle based on a sum of the follow expected angle indicated by the follow mode and the non-follow expected angle;
  determine a first angle based on a sum of the yaw angle of the gimbal base and the first follow yaw angle; and
  determine the first follow yaw angle deviation of the gimbal in the follow mode of the upright shooting mode based on a difference between the first angle and the target expected angle.

18. The device according to claim 15, wherein to control, based on the posture deviation, the gimbal to switch from the first working mode to the second working mode, the at least one processor executes the set of instructions to:
  obtain a yaw angle of the first connection member of the gimbal and the yaw angle of the gimbal;
  determine, based on the yaw angle of the first connection member of the gimbal and the yaw angle of the gimbal, a second non-follow yaw angle deviation of the gimbal for the gimbal to switch to the non-follow mode of a flashlight style mode;
  determine, based on the yaw angle of the first connection member of the gimbal and the yaw angle of the gimbal, a second follow yaw angle deviation of the gimbal for the gimbal to switch to the follow mode of a flashlight style mode; and
  control, based on the second follow yaw angle deviation, the gimbal to switch from the upright shooting mode to the flashlight style mode.

19. The device according to claim 18, wherein to determine, based on the yaw angle of the first connection member of the gimbal and the yaw angle of the gimbal, the second non-follow yaw angle deviation of the gimbal for the gimbal to switch to the non-follow mode of the flashlight style mode, the at least one processor executes the set of instructions to:
  determine, based on a difference between the yaw angle of the gimbal and the yaw angle of the first connection member, a second non-follow yaw angle of the gimbal for the gimbal to switch to the non-follow mode of the flashlight style mode; and
  determine the second non-follow yaw angle deviation of the gimbal in the non-follow mode of the flashlight style mode based on a difference between the second non-follow yaw angle and the non-follow expected angle.

20. The device according to claim 18, wherein to determine, based on the yaw angle of the first connection member of the gimbal and the yaw angle of the gimbal, the second follow yaw angle deviation of the gimbal for the gimbal to switch to the follow mode of the flashlight style mode, the at least one processor executes the set of instructions to:
  determine a second follow yaw angle of the gimbal in the flashlight style mode under the follow mode based on a sum of the second non-follow yaw angle and the first non-follow control angle; and
  determine the second follow yaw angle deviation of the gimbal in the follow mode of the flashlight style mode based on the yaw angle of the first connection member of the gimbal, the second follow yaw angle, and a target expected angle.

\* \* \* \* \*